United States Patent [19]

Shimizu et al.

[11] Patent Number: 5,357,009

[45] Date of Patent: Oct. 18, 1994

[54] POLYMER SCALE PREVENTIVE AGENT

[75] Inventors: Toshihide Shimizu, Urayasu; Mikio Watanabe, Ibaraki, both of Japan

[73] Assignee: Shin-Etsu Chemical Co., Ltd., Tokyo, Japan

[21] Appl. No.: 71,267

[22] Filed: Jun. 4, 1993

[30] Foreign Application Priority Data

Jun. 4, 1992 [JP] Japan .................................. 4-170096

[51] Int. Cl.⁵ ............................ B05D 1/30; C08F 2/00
[52] U.S. Cl. .................................. 526/62; 427/372.2; 427/384; 427/407.1; 427/409; 526/74; 526/317.1; 526/332; 526/335; 526/341; 526/343; 526/344; 526/346; 526/918; 528/288; 528/363; 528/484
[58] Field of Search ................... 526/74, 62; 528/484; 427/407.1

[56] References Cited

U.S. PATENT DOCUMENTS 4,105,839  8/1978  Koyanagi ............................. 526/62
4,115,606  9/1978  Maxson ............................. 427/386

*Primary Examiner*—Fred Zitomer
*Attorney, Agent, or Firm*—Oblon, Spivak, McClelland, Maier & Neustadt

[57] ABSTRACT

A polymer scale preventive agent for use in polymerization of a monomer having an ethylenically unsaturated double bond, comprising an alkaline solution containing a condensation product of (A) an aliphatic diamine compound and (B) an aromatic tetracarboxylic acid anhydride. This agent is used for forming a coating on the inner wall, etc. of a polymerization vessel. Such a vessel is effective in preventing polymer scale deposition, not only on the areas in the liquid phase but also near the interface between the liquid phase and the gas phase in the vessel, and useful in producing a polymer that shows very few fish eyes and good whiteness when formed into sheets or the like.

3 Claims, No Drawings

POLYMER SCALE PREVENTIVE AGENT

BACKGROUND OF THE INVENTION.

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

As a method of polymerizing a monomer having an ethylenically unsaturated double bond, are known suspension polymerization, emulsion polymerization, solution polymerization, gas phase polymerization and bulk polymerization. In any type of the polymerizations, polymer scale is liable to be deposited on the areas with which the monomer comes into contact during polymerization, such as inner walls, stirring equipment and so on of a polymerization vessel.

The deposition of the polymer scale results in disadvantages that the yield of the polymer and cooling capacity of the polymerization vessel are lowered; that the polymer scale may peel and mix into a polymeric product, thereby impairing the quality of formed products obtained by processing the polymeric product; and that removal of such polymer scale is laborious and hence time-consuming. Further, the polymer scale contains unreacted monomers and operators may be exposed thereto, which may cause physical disorders in the operators.

Heretofore, as a method for preventing polymer scale deposition on the inner wall and so forth, methods by which a polymer scale preventive agent comprising an amine compound, quinone compound, aldehyde compound or the like is coated on the inner wall, etc. of a polymerization vessel or methods by which such compounds are added to an aqueous medium for polymerization (Japanese Patent Publication (KOKOKU) No. 45-30343 (1960)).

These methods can prevent the deposition of polymer scale if polymerization run is repeated within about 5 or 6 times; however, the number of repetition of polymerization run exceeds 5 or 6, the scale preventive effect is weakened. That is, the scale preventive effect is poor in durability. Particularly, the scale preventive effect is adversely affected where a water-soluble catalyst is used and unsatisfactory industrially.

It is proposed in Japanese Pre-examination Patent Publication (KOKAI) No. 53-13689(1978) to form a coating of a condensation product of an aromatic amine compound on the areas with which monomers come into contact, such as the inner wall of a polymerization vessel. The formation of the coating of such a condensation product enables repetition of about 100 to 200 polymerization runs without deposition of polymer scale on the areas in the liquid phase, i.e., under the liquid surface inside the polymerization vessel. The effect of preventing the polymer scale deposition on the areas in the liquid phase is achieved even where a water-soluble catalyst is used.

However, polymer scale deposition is liable to occur in the vicinity of the interface between the gas phase and the liquid phase which is located at the upper section of a polymerization vessel. Once polymer scale is deposited in the vicinity of the interface between the gas phase and the liquid phase, the deposited scale will grow gradually as polymerization runs are repeated, and at last it is peeled from the inner wall, etc. and incorporated into the polymeric product. If the polymeric product containing the polymer scale is processed into formed products such as sheets or the like, the polymer scale causes increase in fish eyes in the formed products, lowering seriously the quality thereof.

Besides, where polymeric products obtained by polymerization are processed into formed products such as sheets, etc., the formed products are required to have a high whiteness. That is, when a polymeric product is formed into a sheet or the like without any addition of a coloring agent, the resulting formed product is more or less colored. Such coloration is called initial coloration, which is desired to be as low as possible. However, the coating comprising said condensation product of an aromatic amine compound disclosed in the Japanese Pre-examination Publication may be peeled or dissolved into a polymeric product, thereby lowering the whiteness, or increasing the initial coloration, of the formed products.

Furthermore, in forming a coating of the condensation product of the aromatic amine compound as described above, the condensation product is dissolved in a solvent to prepare a coating solution. The solvent is an organic solvent or a mixed solvent of water and an organic solvent, the mixed solvent being based on the organic solvent and normally containing the organic solvent in a concentration of 60% by weight or above. Therefore, there are dangers of inflammation, explosion or the like due to the use of an organic solvent, together with safety problems in handling, such as toxicity.

SUMMARY OF THE INVENTION

It is accordingly an object of the present invention to provide a polymer scale preventive agent for use in polymerization of a monomer having an ethylenically unsaturated double bond that can prevent effectively the deposition of polymer scale not only in the areas in the liquid phase but also in the vicinity of the interface between the gas and liquid phases, that makes it possible to produce polymeric products with a very small number of fish eyes and low initial coloration after processed into formed products such as sheets or the like, and that is free from dangers of inflammation, explosion or the like of organic solvent in forming a coating comprising the agent and also from safety problems in handling thereof, e.g., toxicity; a polymerization vessel using the same; and a process of producing a polymer using the vessel.

Thus, the present invention provides a polymer scale preventive agent for use in polymerization of a monomer having an ethylenically unsaturated double bond, comprising an alkaline solution containing a condensation product of (A) an aliphatic diamine compound and (B) an aromatic tetracarboxylic acid anhydride.

The present invention also provides a polymerization vessel for polymerizing a monomer having an ethylenically unsaturated double bond, comprising a coating on its inner wall surfaces, whereby polymer scale is prevented from being deposited, wherein said coating has been formed by applying an alkaline solution containing a condensation product of (A) an aliphatic diamine compound and (B) an aromatic tetracarboxylic acid anhydride, followed by drying.

Further, the present invention provides a process of producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline solution containing a condensation product of (A) an aliphatic diamine compound and (B) an aromatic tetracarboxylic acid anhydride, followed by drying.

According to the present invention, deposition of polymer scale can be effectively prevented not only on the areas in the liquid phase but also in the vicinity of the interface between the gas and liquid phases in a polymerization vessel. Therefore, the present invention makes it unnecessary to conduct the operation of removing the polymer scale after every polymerization run, and the productivity is thereby improved.

Further, when the polymeric product obtained by the application of the present invention is processed into formed products such as sheets, the resulting formed products have very few fish eyes. Furthermore, the formed products obtained as above is low in initial coloration. That is, the formed products exhibit a luminosity index L in the Hunter's color difference equation described in JIS Z 8730(1980) of 70 or more in the case of vinyl chloride polymers and 80 or more in the case of SBR.

Moreover, the polymer scale preventive agents according to the present invention can be applied to inside wall surfaces of a polymerization vessel as a coating liquid to form a coating on the surfaces while using a reduced amount of organic solvent; therefore, the polymer scale preventive agents of the present invention are free from dangers of inflammation, explosion or the like due to the use of organic solvent and also from safety problems in handling thereof, e.g., toxicity.

DETAILED DESCRIPTION OF PREFERRED EMBODIMENTS

The condensation product, the essential component of the polymer scale preventive agent, is obtained by condensing (A) an aliphatic diamine compound and (B) an aromatic tetracarboxylic acid anhydride.

Raw materials and syntheses thereof are described below.

(A) Aliphatic diamine compound

The aliphatic diamine compound (A) is an aliphatic organic compound having two primary amino groups (—NH$_2$), such as, for example, diaminoalkanes, diaminocycloalkanes, diaminodialkylamines, diaminodialkyl sulfides, piperazines and the like.

Among the diaminoalkanes for use as the aliphatic diamine compound (A), preferred are those having from 2 to 12 carbon atoms. Specific examples of such diaminoalkanes include 1,2-diaminoethane, 1,2-diaminopropane, 1,3-diaminopropane, 1,4-diaminobutane, 1,7-diaminoheptane, 1,6-diaminohexane, 1,8-diaminooctane, 9,10-diaminononane, 1,10-diaminodecane, 1,12-diaminododecane, 1,2-diamino-2-methylpropane, and the like- In each of these diaminoalkanes, at least one of the hydrogen atoms bonded to a carbon atom may have been substituted by a substituent group such as hydroxyl group or the like. Specific examples of such substituted diaminoalkanes include 1,3-diamino-2-hydroxypropane and the like.

Among the diaminocycloalkanes which can be used as the aliphatic diamine compound (A), preferred are those having from 3 to 8 carbon atoms, for example, 1,4-diaminocyclohexane, bis(4-aminocyclohexyl)methane and the like. In each of the usable diaminocycloalkanes, at least one of the hydrogen atoms bonded to a carbon atom may have been substituted by a substituent group such as hydroxyl group or the like. Specific examples of such substituted diaminocycloalkanes include 1,4-diamino-2-hydroxycyclohexane and so forth.

The diaminodialkylamines for use as the aliphatic diamine compound (A) are compounds which have the general formula (1):

$$H_2N—C_mH_{2m}—NR^1—C_nH_{2n}—NH_2 \quad (1)$$

wherein m and n may be the same or different and are each an integer from 1 to 6, and R$^1$ is —H or an alkyl group of from 1 to 6 carbon atoms. The diaminodialkylamines include, for example, bis(3-aminopropyl)amine, bis(3-aminopropyl)methylamine, bis(5-aminoheptyl)methylamine, and the like.

The diaminodialkyl sulfides for use as the aliphatic diamine compound (A) are compounds which have the general formula (2):

$$H_2N—C_mH_{2m}—S—C_nH_{2n}—NH_2 \quad (2)$$

wherein m and n are the same as above. Specific examples of the diaminodialkyl sulfides include bis(3-aminopropyl) sulfide, bis(5-aminoheptyl) sulfide, and the like.

Among the above-described aliphatic diamine compounds, preferred are 1,2-diaminoethane, 1,3-diaminopropane, 1,3-diamino-2-hydroxypropane, 1,4-diaminocyclohexane, bis(3-aminopropyl)methylamine, bis(3-aminopropyl) sulfide and piperazine.

The aliphatic diamine compounds as above may be used either singly or in combination of two or more.

(B) Aromatic tetracarboxylic acid anhydride

The aromatic tetracarboxylic acid anhydrides (B) include, for example, pyromellitic anhydrides, 2,2'-bis(3,4-dicarboxyphenyl)propanoic dianhydride, 2,3,6,7-naphthalene tetracarboxylic dianhydride, bis(3,4-dicarboxyphenyl)sulfone dianhydride, 3,4,3',4'-biphenyl tetracarboxylic dianhydride, 3,4,9,10-perylene tetracarboxylic dianhydride, 1,2,5,6-naphthalene tetracarboxylic dianhydride, bis(3,4-dicarboxyphenyl) ether dianhydride, 2,3,2',3'-biphenyltetracarboxylic dianhydride, 3,4,3',4'-benzophenone tetracarboxylic dianhydride, 2,3,4,5-thiophenone tetracarboxylic dianhydride, and 2,6,2',6'-biphenyl tetracarboxylic dianhydride. Among these compounds, preferred are pyromellitic anhydride, 1,2,5,6-naphthalene tetracarboxylic dianhydride, 2,3,6,7-naphthalene tetracarboxylic dianhydride, and 2,6,2',6'-biphenyltetracarboxylic dianhydride.

The aromatic tetracarboxylic acid anhydrides can be used singly or in combination of two or more.

Condensation product

The condensation product of the aliphatic diamine compound (A) and the aromatic tetracarboxylic acid anhydride (B), which is the effective component of the present polymer scale preventive agent, can be prepared by reacting the components (A) and (B) at a temperature of room temperature to about 100° C. in a suitable organic solvent-based medium for about 0.5 to 300 hours, preferably at a temperature of from room temperature to 50° C. for 1 to 100 hours.

As the reaction medium for the condensation reaction, normally an organic solvent is used. The organic solvents for the condensation reaction include alcohol solvents such as methanol, ethanol, propanol, butanol, 2-butanol, 2-methyl-1-propanol, 2-methyl-2-propanol, 3-methyl-1-butanol, 2-methyl-2-butanol, 2-pentanol and the like, ketone solvents such as, for example, acetone, dioxane, methyl ethyl ketone, methyl isobutyl ketone and the like, ester solvents such as methyl formate, ethyl formate, methyl acetate, methyl acetoacetate and the like, ether solvents such as, for example, 4-methyldioxolan, diethyl ether, ethylene glycol diethyl ether and the like, chlorinated hydrocarbons such as, for example, methylene chloride, chloroform, carbon tetrachloride, trichloroethylene, perchloroethylene and the like, hydrocarbon solvents such as, for example, n-heptane, n-hexane and the like, furans such as, for example, tetrahydrofuran, dimethyl formamide, dimethyl acetamide, dimethyl sulfoxide, dimethyl sulfone, acetonitrile, pyridine, N-methylpyrrolidone, m-cresol, etc. These solvents may be used singly or in combination of two or more.

Although the amounts of the aliphatic diamine compound (A) and the aromatic tetracarboxylic acid anhydride (B) subjected to the condensation reaction depend on the kinds of the aliphatic diamine compound (A), the aromatic tetracarboxylic acid anhydride (B) and solvent, reaction temperature, reaction time, etc., nominally the aromatic tetracarboxylic acid anhydride (B) is used in an amount of about 0.01 to about 5 moles, preferably 0.3 to 3 moles, per mole of the aliphatic diamine compound (A). If the amount of the component (B) is too small or too large relative to that of the component (A), the resulting condensation product is poor in polymer scale preventing effect.

After the completion of the condensation reaction, where the resulting condensation product is settled, the condensation product may be subjected to filtration; where the resulting condensation product is dissolved in the solvent, the solution may be added to a poor solvent, such as water, for example, to settle it in the solution, followed by filtration.

Polymer scale preventive agent comprising an alkaline solution containing the condensation product of components (A) and (B)

The polymer scale preventive agent of the present invention comprises an alkaline solution of the condensation product of the components (A) and (B), which is used for forming a coating on, for example, the inner wall surfaces of a polymerization vessel, and the deposition of polymer scale is thereby prevented.

For example, the polymer scale preventive agent may be prepared by mixing the condensation product with an aqueous solvent and dispersing it therein, and controlling the pH of the resulting mixture to the alkaline range, to form a uniform solution.

Since the polymer scale preventive agent of the present invention is made alkaline as described above, the solubility of the condensation product of the components (A) and (B) in the aqueous solvent is increased and the solution is made uniform, so that its polymer scale preventing effect is presumably enhanced when coated on the inner wall, etc. of a polymerization vessel.

The aqueous solvents to be used for preparation of the polisher scale preventive agent include, for example, water and mixed solvents of water and an organic solvent compatible with water. The organic solvent compatible with water includes, for example, alcohols such as methanol, ethanol, propanol, etc.; ketones such as acetone, methyl ethyl ketone, etc.; esters such as methyl acetate, ethyl acetate, etc. These solvents may be used singly or as a mixed solvent of two or more thereof on the case-by-case basis. The mixed solvents of water and an organic solvent compatible with water preferably contains the organic solvent in such an amount that there is no fear about inflammation, explosion or the like and safety in handling is ensured as to virulence, etc. Specifically, the amount of the organic solvent is preferably 50% by weight or less, and more preferably 30% by weight or less.

The pH of the polymer scale preventive agent of the present invention is preferably in the range of 7.5 to 13.5, more preferably 9.0 to 12.0. As an alkaline compound to be used for adjusting pH, for example, alkali metal compounds such as LiOH, NaOH, KOH, $Na_2CO_3$, $Na_2SiO_3$, $Na_2HPO_4$ and the like, ammonium compounds such as $NH_4OH$, and organic amine compounds such as ethylenediamine, propylenediamine, monoethanolamine, triethanolamine and the like, can be used.

The concentration of the condensation product of the components (A) and (B) in the alkaline solution is not limited as long as a total coating weight described later can be obtained. Normally, the concentration is in the range of about 0.005 to about 10% by weight, preferably 0.01 to 5% by weight.

To the polymer scale preventive agent described above is preferably added a cationic, nonionic or anionic surface active agent, as long as the polymer scale preventing effect is not impaired. Further, a water-soluble polymeric compound such as cationic polymeric compounds, anionic polymeric compounds and amphoteric polymeric compounds can be optionally added.

The cationic polymeric compound includes cationic polymeric electrolytes containing a nitrogen atom with positive charge in the side chain, including, for example, polyvinylamines, polyethyleneamines, polyethyleneimines, polyacrylamides, N-vinyl-2-pyrrolidone/acrylamide copolymer, cyclic polymers of dimethyldiamylammonium chloride, cyclic polymers of dimethyldiethylammonium bromide, cyclic polymers of diallylamine hydrochloride, cyclic polymers of dimethyldiamylammonium chloride and sulfur dioxide, polyvinylpyridines, polyvinylpyrrolidones, polyvinylcarbazoles, polyvinylimidazolines, polydimethylaminoethyl acrylates, polydimethylaminoethyl methacrylates, polydiethylaminoethyl acrylate, and polydiethylaminoethyl methacrylate.

The anionic polymeric compound includes, for example, anionic polymeric compounds having a carboxyl group or sulfonic acid group in the side chain as exemplified by sulfomethylated compounds of polyacrylamide, polyacrylic acid, alginic acid, an acrylamide/vinylsulfonic acid copolymer, polymethacrylic acid and polystyrenesulfonic acid, and alkali metal salts or ammonium salts of these, and carboxymethyl cellulose.

The amphoteric polymeric compounds include, for example, glue, gelatin, casein, and albumin.

Furthermore, if necessary, inorganic compounds can also be added to the polymer scale preventive agent of the present invention as desired, provided the scale preventing effect is not thereby impaired. The inorganic compounds which can be added include, for example, silicic acids or silicates such as orthosilicic acid, metasilicic acid, mesodisilicic acid, mesotrisilicic acid, mesotetrasilicic acid, sodium metasilicate, water glass, etc.; metallic salts such as oxyacid salts, acetates, nitrate, hydroxides or halides of metal selected from alkaline earth metals such as magnesium, calcium and barium, zinc family group metals such as zinc, aluminum family metals such as aluminum, and platinum family metals such as platinum; inorganic colloids such as ferric hydroxide colloid, silicic acid colloid, barium sulfate colloid, aluminum hydroxide colloid, and the like. The inorganic colloids may be prepared, for example, by mechanical grinding, irradiation with ultrasonic wave, electrical dispersing techniques or chemical techniques.

Formation of the coating

The polymer scale preventive agent is applied to the inner walls of a polymerization vessel and then dried sufficiently at a temperature from room temperature to 100° C., for instance, followed by washing with water if necessary, to form the coating.

The polymer scale preventive agent is preferably applied to not only the inner wall surfaces of a polymerization vessel but also other areas with which the monomer comes into contact during polymerization to form the coating on such areas. For example, on an stirring shaft, stirring blades, baffles, condensers, headers, search coil, bolts, nuts, etc.

More preferably, for formation of the coating, the polymer scale preventive agent is applied to areas with which the monomer does not come into contact during polymerization but on which polymer scale may be deposited, for example, areas with which unreacted monomer comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the scale preventing agent to the inner wall surfaces of a polymerization vessel, etc. is not particularly restricted, and includes, for example, the brush coating, spray coating, the method by filling the polymerization vessel with the scale preventive agent followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive agent, is not restricted, either. Following methods can be used. That is, a method in which, after the agent is applied, hot air with an suitable elevated temperature is blown to the coated surface, and a method in which the inner wall surface of a polymerization vessel and the surfaces of other parts to be coated are previously heated to 30° to 80° C., and the polymer scale preventive agent is directly applied to the heated inner wall surfaces, etc. After dried, the coated surfaces are washed with water if necessary.

The coating thus obtained has a coating weight of normally 0.001 g/m$^2$ to 5 g/m$^2$, and preferably from 0.05 to 2 g/m$^2$.

The coating operation may be conducted every one to ten-odd batches of polymerization run. The formed coating has good durability and retains the scale-preventing action; therefore the coating operation may be performed every several batches of polymerization. Thus, the polymerization vessel can be used repeatedly without deposition of polymer scale, and productivity is improved.

Polymerization

After the formation of the coating on the inner wall surfaces of a polymerization vessel, and preferably other parts with which monomer may come into contact during polymerization, polymerization is carried out in accordance with conventional procedures. That is, a monomer having an ethylenically unsaturated double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or anhydrides thereof; and diene monomers such as butadiene, chloroprene and isoprene; styrene, acrylonitrile, vinylidene halides such as vinylidene chloride, and vinyl ethers. These may be used singly or in combination of two or more.

There are no particular limitations on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to suspension or emulsion polymerization in an aqueous medium.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of 0.1 to 760 mmHg, and a monomer is then charged (whereupon the pressure inside the polymerization vessel usually becomes from 0.5 to 30 kgf/cm$^2$·G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50 to 150° C. The polymerization may be judged to be completed when the pressure inside the polymerization vessel falls to from 0 to 7 kgf/cm$^2$·G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In solution polymerization, an organic solvent such as toluene, xylene and pyridine is used as the polymerization medium in place of water. The dispersing agent is optionally used. The other conditions are generally the same as those described for suspension and emulsion polymerizations.

In bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. For example, the reaction temperature is 30° to 80° C. in the case of polymerizing vinyl chloride, and is 50° to 150° C. in the case of styrene.

The present invention makes it possible to prevent polymer scale from being deposited, independent of materials constituting the inner wall, etc. of a polymerization vessel. For example, this invention can prevent deposition of polymer scale even in the case where polymerization is carried out in a polymerization vessel made of a steel including stainless steel or lined with glass.

Any additive materials that have been conventionally added in a polymerization system can be used without any limitation. More specifically, the method of this invention can effectively prevent polymers from being deposited, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

The polymer scale preventive agent of the present invention may be added to a polymerization mass in addition to the formation of the coating, so that the scale preventing effect is further improved. The amount of the polymer scale preventive agent to be added to the polymerization mass preferably in the range of about 10 to about 1,000 ppm based on the whole weight of the monomers charged. The addition should be conducted so that it may not adversely affect the quality of polymeric products to be obtained with respect to fish eyes, bulk density, particle size distribution, etc.

EXAMPLES

The working examples of the present invention and comparative examples will now be described below. In each table below, experiments marked with * are comparative examples and the other working examples of the present invention.

Production Example 1

Production of Condensation Product No. 1

0.3 mol of 1,4-diaminocyclohexane was dissolved in acetone with stirring at room temperature. Separately, 0.3 mol of 2,3,6,7-naphthalenetetracarboxylic dianhydride was dissolved in acetone with stirring at room temperature.

The resulting acetone solution of 1,4-diaminocyclohexane and the acetone solution of 2,3,6,7-naphthalenetetracarboxylic dianhydride were charged into a 3-liter autoclave and mixed. The resulting mixture was subjected to reaction at 10° to 30° C. for 10 hours. After the completion of the reaction, a condensation product that settled was filtered off and then dried in vacuum at room temperature. The condensation product thus obtained is referred to as Condensation Product No. 1

Production of Condensation Product Nos. 2–13

In each production, the procedure of production for Condensation Product No.1 described above was repeated, except for using an aliphatic diamine compound (A) and an aromatic tetracarboxylic acid anhydride (B) as given in Table 1 and a solvent as given in Table 2, to produce a condensation product. In Table 2, total mol numbers of the components (A) and (B), (A):(B) ratio, reaction temperature and reaction time in each production are given. Thus, Condensation Product Nos. 2 to 13 were obtained.

TABLE 1

| Condensation product No. | (A) Aliphatic diamine compound | (B) Aromatic carboxylic acid anhydride |
|---|---|---|
| 1 | 1,4-Diaminocyclohexane | 2,3,6,7-Naphthalenetetracarboxylic dianhydride |
| 2* | 1,4-Diaminocyclohexane | — |
| 3* | — | 2,3,6,7-Naphthalenetetracarboxylic dianhydride |
| 4 | Peperazine | 3,4,3',4'-Biphenyltetracarboxylic dianhydride |
| 5 | Peperazine | 2,2'-Bis(3,4-Dicarboxyphenyl)-propanoic dianhydride |
| 6 | Bis(3-aminopropyl)-amine | 3,4,3',4'-Biphenyltetracarboxylic dianhydride |
| 7 | Bis(3-aminopropyl)-amine | Pyromellitic anhydride |
| 8 | Bis(3-aminopropyl) sulfide | 2,2'-Bis(3,4-dicarboxyphenyl)-propanoic dianhydride |
| 9 | Bis(3-aminopropyl) sulfide | 1,2,5,6-Naphthalenetetracarboxylic dianhydride |
| 10 | 1,10-Diaminodecane | 3,4,3',4'-Biphenyltetracarboxylic dianhydride |
| 11 | 1,10-Diaminodecane | Bis(3,4-dicarboxyphenyl) ether dianhydride |
| 12 | 1,2-Diamino-2-methylpropane | 3,4,9,10-Perylenetetracarboxylic dianhydride |
| 13 | 1,3-Diamino-2-hydroxypropane | 2,3,6,7-Naphthalenetetracarboxylic dianhydride |

TABLE 2

| Condensation product No. | Total of (A) + (B) (mol) | (A):(B) (mol ratio) | Solvent | Reaction temp. (°C.) | Reaction time (Hr) |
| --- | --- | --- | --- | --- | --- |
| 1 | 0.6 | 1:1 | Acetone | R.T. | 10 |
| 2* | 0.3 | — | Acetone | — | — |
| 3* | 0.3 | — | Acetone | — | — |
| 4 | 0.3 | 1:1.5 | Dioxane | R.T. | 10 |
| 5 | 0.3 | 1:0.7 | Tetrahydrofuran | R.T. | 10 |
| 6 | 0.3 | 1:1 | Acetonitrile | 40° C. | 30 |
| 7 | 0.3 | 1:1.2 | Dimethylformamide | R.T. | 30 |
| 8 | 0.4 | 1:1.2 | Dimethyl sulfoxide | R.T. | 60 |
| 9 | 0.4 | 1:1.2 | Dimethylformamide | R.T. | 60 |
| 10 | 0.4 | 1:1 | Acetonitrile | R.T. | 80 |
| 11 | 0.4 | 1:1 | Dimethyl formamide | R.T. | 60 |
| 12 | 0.4 | 1:1 | Dimethyl sulfoxide | R.T. | 60 |
| 13 | 0.4 | 1:1 | Acetonitrile | R.T. | 60 |

Example 1

(Experiment Nos. 101 to 114)

In each experiment, polymerization was conducted using a stainless steel polymerization vessel with an inner capacity of 1,000 liters and having an agitator, as described below.

First, a polymer scale preventive agent as shown in Table 3 (solvent composition, concentration of a condensation product and pH) was prepared using a condensation product, a solvent and an alkaline compound given in Table 3. The polymer scale preventive agent was applied to the inner wall, the stirring shaft, the stirring blades and other areas with which a monomer comes into contact of the polymerization vessel. The applied polisher scale preventive agent was dried by heating at 40° C. for 15 minutes to form a coating, and the inside of the vessel was then washed with water.

Thereafter, into the polymerization vessel in which the coating was formed as above, 400 kg of water, 200 kg of vinyl chloride, 250 g of a partially saponified polyvinyl alcohol, 25 g of hydroxypropyl methyl cellulose and 70 g of 3,5,5-trimethylhexanoyl peroxide were charged, followed by polymerization at 66° C. for 6 hours. After the completion of the polymerization, the produced polymer was taken out and unreacted monomer was recovered out of the polymerization vessel. Subsequently, the inside of the polymerization vessel was washed with water and residual resin was removed.

A batch of operations of charging the materials into the polymerization vessel through polymerization to washing with water as described above (excluding the operation of forming the coating) was repeated. The number of repetition of the batch for each experiment is given in Table 4. After the final batch, the amount of polymer scale deposited on an area located in the liquid phase during polymerization and on an area in the vicinity of the interface between the gas and liquid phases, was measured according to the method below.

Measurement of the Amount of Polymer scale

The scale deposited in an area of 10 cm square on the inner wall is scraped off with a stainless steel spatula as completely as possible to be confirmed with naked eyes, and then the scraped scale is weighed on a balance. Thereafter, the amount of the deposited scale per area of 1 m² is obtained by multiplying the measured value by 100.

The number of fish eyes which may appear when a polymer is formed into sheet was measured with respect to the polymers produced in the experiments according to the method below.

Measurement of Fish Eyes

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 cm² by light transmission.

Further, to evaluate initial coloration at the time a polymer is formed into sheet, luminosity index L was measured according to the method below.

Measurement of Luminosity Index L

A hundred parts by weight of a polymer, 1 part by weight of a tin laurate stabilizing agent (trade name: TS-101, product of Akisima Chemical Co.) and 0.5 part by weight of cadmium stabilizing agent (trade name: C-100J, product of Katsuta Kako Co.), and 50 parts by weight of DOP are kneaded at 160° C. for 5 minutes with a twin roll mill, and then formed into a sheet 1 mm thick. Subsequently, this sheet is placed in a mold measuring 4 cm×4 cm×1.5 cm (depth), and molded under heating at 160° C. and a pressure of 65 to 70 kgf/cm² for 0.2 hours to prepare a test specimen. This test specimen is measured for luminosity index L in the Hunter's color difference equation described in JIS Z 8730 (1980). The more the value of L, the lower the initial coloration.

The value of L was determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 is adopted. Next, L is calculated based on the equation: $L = 10Y^{1/8}$ described in JIS Z 8730 (1980).

The results of the above measurements are set forth in Table 4.

TABLE 3

| | Polymer scale preventive agent | | | | |
| --- | --- | --- | --- | --- | --- |
| Exp. No. | Condensation product No. | Concentration (wt. %) | Alkaline compound | pH | Solvent (weight ratio) |
| 101 | 1 | 0.3 | Ethylenediamine | 11.8 | Water |
| 102* | 2 | 0.3 | Ethylenediamine | 11.8 | Water |
| 103* | 3 | 0.3 | Ethylenediamine | 11.8 | Water |
| 104 | 4 | 0.3 | NaOH | 12.0 | Water:Methanol (95:5) |

TABLE 3-continued

| Exp. No. | Condensation product No. | Concentration (wt. %) | Alkaline compound | pH | Solvent (weight ratio) |
|---|---|---|---|---|---|
| 101 | 1 | 0.3 | Ethylenediamine | 11.8 | Water |
| 105 | 5 | 0.2 | NaOH | 12.0 | Water:Methanol (95:5) |
| 106 | 6 | 0.2 | NaOH | 11.5 | Water:Methanol (90:10) |
| 107 | 7 | 0.1 | Ethylenediamine | 11.0 | Water:Methanol (90:10) |
| 108 | 8 | 0.2 | Ethylenediamine | 11.5 | Water:Methanol (90:10) |
| 109 | 9 | 0.2 | Ethylenediamine | 11.5 | Water |
| 110 | 10 | 0.2 | Triethanolamine | 11.5 | Water |
| 111 | 11 | 0.2 | Triethanolamine | 11.5 | Water |
| 112 | 12 | 0.2 | Monoethanolamine | 11.5 | Water |
| 113 | 13 | 0.2 | Monoethanolamine | 11.0 | Water:Methanol (95:5) |
| 114* | 1 | 0.3 | — | 6.5 | Water |

TABLE 4

| Exp. No. | Number of repeated batches (batch) | Polymer scale amount (g/m$^2$) Liquid phase | Polymer scale amount (g/m$^2$) Around interface of gas and liquid phases | Number of fish eyes | Luminosity index (L) |
|---|---|---|---|---|---|
| 101 | 5 | 0 | 20 | 9 | 73.0 |
| 102* | 2 | 850 | 2400 | 60 | 73.0 |
| 103* | 2 | 900 | 2500 | 58 | 73.0 |
| 104 | 5 | 0 | 22 | 8 | 73.0 |
| 105 | 5 | 0 | 23 | 7 | 73.0 |
| 106 | 5 | 0 | 22 | 7 | 73.0 |
| 107 | 5 | 0 | 18 | 13 | 73.0 |
| 108 | 5 | 0 | 30 | 11 | 73.0 |
| 109 | 5 | 0 | 18 | 9 | 73.0 |
| 110 | 5 | 0 | 21 | 8 | 73.0 |
| 111 | 5 | 0 | 17 | 8 | 73.0 |
| 112 | 5 | 0 | 17 | 9 | 73.0 |
| 113 | 5 | 6 | 18 | 8 | 73.0 |
| 114* | 2 | 150 | 330 | 60 | 73.0 |

Example 2

(Experiment Nos. 201 to 209)

In each experiment, polymerization was conducted using a stainless steel polymerization vessel with an inner capacity of 20 liters and having an agitator, as described below.

First, a polymer scale preventive agent as shown in Table 5 (solvent composition, concentration of condensation product and pH) was prepared using a condensation product, solvent and alkaline compound given in Table 5. The polymer scale preventive agent was applied to the inner wall, the stirring shaft, the stirring blades and other areas with which a monomer comes into contact of the polymerization vessel. The applied polymer scale preventive agent was dried by heating at 40° C. for 15 minutes to form a coating, which was then washed with water.

Thereafter, into the polymerization vessel in which the coating was formed as above, 9 kg of water, 225 g of sodium dodecylbenzenesulfonate, 12 g of t-dodecyl mercaptan and 13 g of potassium peroxodisulfate were charged. After the inside of the polymerization vessel was replaced with a nitrogen gas, 1.3 kg of styrene and 3.8 kg of butadiene were charged, followed by polymerization at 50° C. for 20 hours. After the completion of the polymerization, the produced polymer was taken out and unreacted monomer was recovered out of the polymerization vessel. Subsequently, the inside of the polymerization vessel was washed with water and residual resin was removed.

A batch of operations of charging the materials into the polymerization vessel through polymerization to washing with water as described above (excluding the operation of forming the coating) was repeated. The number of repetition of the batch for each experiment is given in Table 6. After the final batch, the amount of polymer scale deposited on an area located in the liquid phase during polymerization and on an area in the vicinity of the interface between the gas and liquid phases, was measured according to the method below.

Further, to evaluate initial coloration at the time a polymer is formed into sheet, luminosity index L was measured according to the method below.

Measurement of Luminosity Index L

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm$^2$ for 0.2 hours and press molded under the final pressure of 80 kgf/cm$^2$ to prepare a test specimen.

This test specimen was measured for luminosity index L in the same manner as in Example 1.

The results of the above measurements are set forth in Table 6.

TABLE 5

| Exp. No. | Polymer scale preventive agent | | | | |
|---|---|---|---|---|---|
| | Condensation product No. | Concentration (wt. %) | Alkaline compound | pH | Solvent (weight ratio) |
| 201 | 1 | 0.5 | Ethylenediamine | 11.5 | Water |
| 202* | 2 | 0.5 | Ethylenediamine | 11.5 | Water |
| 203* | 3 | 0.5 | Ethylenediamine | 11.5 | Water |
| 204* | 1 | 0.5 | — | 6.0 | Water |
| 205 | 4 | 0.3 | NaOH | 10.5 | Water:Methanol (95:5) |
| 206 | 5 | 0.3 | NaOH | 12.0 | Water:Methanol (95:5) |
| 207 | 6 | 0.5 | Monoethanolamine | 11.5 | Water:Methanol (95:5) |
| 208 | 7 | 0.5 | Triethanolamine | 11.0 | Water:Methanol (95:5) |
| 209 | 8 | 0.5 | Ethylenediamine | 12.0 | Water:Methanol (95:5) |

TABLE 6

| Exp. No. | Number of repeated batches (batch) | Results of polymerization | | Luminosity index (L) |
|---|---|---|---|---|
| | | Polymer scale amount (g/m$^2$) | | |
| | | Liquid phase | Around interface of gas and liquid phases | |
| 201 | 3 | 9 | 25 | 86.0 |
| 202* | 2 | 250 | 2200 | 85.5 |
| 203* | 2 | 300 | 2700 | 85.5 |
| 204* | 2 | 30 | 350 | 86.0 |
| 205 | 3 | 2 | 25 | 86.0 |
| 206 | 3 | 1 | 28 | 86.0 |
| 207 | 3 | 0 | 28 | 86.0 |
| 208 | 3 | 0 | 230 | 86.0 |
| 209 | 3 | 2 | 25 | 85.5 |

We claim:

1. A process of producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline solution containing a condensation product of (A) an aliphatic diamine compound and (B) an aromatic tetracarboxylic acid anhydride, followed by drying.

2. The process of claim 1, wherein said polymerization is conducted as suspension polymerization, emulsion polymerization, solution polymerization, bulk polymerization or gas phase polymerization.

3. The process of claim 1, wherein said monomer is selected from the group consisting of vinyl esters; vinyl halides; vinylidene halides; acrylic acid, methacrylic acid and their esters and salts; diene monomers; styrene; acrylonitrile; α-methylstyrene; and vinyl ethers.

* * * * *